Patented Apr. 23, 1940

2,198,214

UNITED STATES PATENT OFFICE 2,198,214

RETAINING CAROTENE CONTENT OF FRESHLY CUT GRASSES

Sidney Musher, New York, N. Y., assignor to Musher Foundation Incorporated, New York, N. Y., a corporation of New York No Drawing. Application April 25, 1939, Serial No. 269,913

8 Claims. (Cl. 99—8)

This invention relates to the preservation to a substantial degree of the carotene and pro-vitamin A content of substantially high moisture containing alfalfa.

Alfalfa when cut contains about 50% to 80% moisture. It also contains substantial amounts of carotene which is a most important constituent and which tends to disappear upon storage.

The farmer must store this cut alfalfa over the winter, for feeding to dairy cows and other animals. Alfalfa rapidly loses its carotene content during the drying period and during the normal storage period so that frequently there is substantially no carotene left at the time the grass is fed. This results in cows giving milk that is readily susceptible to oxidation and may also result in malnutrition for the animal being fed.

An object of this invention is therefore the retention of carotene or pro-vitamin A content in alfalfa, during the drying and storage period, and by relatively simple, effective and economical means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is added to alfalfa, containing its normal high moisture content, a small amount of a combination of a water soluble carbohydrate, preferably sucrose, lactose or dextrose, and a phosphorus containing compond, preferably a phosphatide such as lecithin.

This combination of materials is then thoroughly admixed with and through the undried alfalfa, and the alfalfa containing this combination is then dried at a temperature of substantially over 150° F. and preferably at a temperature of at least 250° F. or higher.

Under the conditions of the heat treatment, during the drying of the alfalfa and in the presence of the sugar and phosphorus compound combination, a marked protective effect is obtained against the loss of carotene. This effect is obtained while the drying takes place and in which the water content is reduced to under 20% and preferably to less than 15%.

The alfalfa thus obtained may be used for any purpose, such as for admixture in stock feed where copper, manganese, and other metallic constituents are used and which act as pro-oxidants whereby the alfalfa shows a rapid and marked loss of carotene contained therein.

The treated alfalfa may also be used for storing in silos, or for any other use as in poultry feeding, etc. It is found that when the alfalfa is treated in this manner, its carotene content is retained to a marked degree over a long storage period such as over a period of 4 or 5 months and whereby its nutritional values will be considerably retained during that storage period.

Example I

Fresh green alfalfa having a moisture content of 63% was cut, and then chopped into fine pieces. A mixture comprising 80% dextrose and 20% soya lecithin was made up, which upon thorough admixture became granular and almost powdery. This granular dextrose-lecithin combination was mixed with 10 times its weight of the finely divided fresh green alfalfa.

The combination of the dextrose-lecithin with the larger amount of alfalfa was then added to the entire batch of the alfalfa on the basis of using 0.5% of the original dextrose-lecithin combination against the solids weight of the alfalfa.

The alfalfa containing the granular dextrose-lecithin combination was then fed into a revolving cylinder having inside paddles to produce agitation. Due to the granular nature of the dextrose-lecithin combination, it was immediately distributed throughout the mass of the alfalfa. To one side of the cylinder air was blown in after having been heated from a fuel oil furnace, the air having a temperature of approximately 1000° F. at the time of introduction. This air was run over and through the wet alfalfa and at the time of its leaving the cylinder, the temperature of the air was around 250° F. to 275° F.

The temperature of the alfalfa during the preliminary drying operation was about 212° F. but as the drying continued, the temperature of the alfalfa went as high as about 250° F.

The drying was continued until the moisture content of the alfalfa was down to 7%. The alfalfa which was dried in this manner after the introduction of the dextrose-lecithin combination retained its carotene content approximately twice as long as a similar grade of alfalfa which had been dried in a similar manner but to which none of the dextrose-lecithin combination had been added.

In place of dextrose, any of the water soluble carbohydrates may be used, such as the mono, di and tri saccharides, including sucrose, fructose, glucose, arabinose, mannose, etc., raw or refined cane, beet or other sugars, residue or mother liquors obtained during the normal manufacturing operation of the refined sugars, sorghum or blackstrap molasses, etc.

Although lecithin is preferable for use, it is also possible to use other organic or inorganic phosphorus containing materials such as cephalin, phosphoric acid, acid phosphates, salts of phosphoric acid etc. Of these other materials, the most desirable, in addition to lecithin, is phosphoric acid. Where lecithin is employed, such lecithin may be obtained from soya bean oil or similar material, or may be obtained as a by-product from the refining of oils as when extracted from soap stock, etc.

It is possible to use any moderate variation of the sugar to lecithin. For example 1 part of sugar to 10 parts of lecithin may be employed although it is desirable to use more sugar then lecithin. As much as 20 parts of sugar to 1 part of lecithin may be used. For practical purposes, however, mixtures of between 1 and 10 parts of sugar to 1 part lecithin have shown very good results. Naturally the amounts of sugar and lecithin to be used will be dependent upon the degree of antioxidant action that is desired and the treatment to be given the alfalfa that is treated.

Where phosphoric acid is used, even lesser amounts may be used than in the case of lecithin. For example, a mixture may be prepared comprising as little as 1% of phosphoric acid and 99% of cane sugar to be used for application to the alfalfa before subjecting to the high temperature treatment.

Any desirable percentage of the dextrose-lecithin or similar combination may be employed but it is preferable to use less than 5% and desirably under 2%. Under normal conditions it has been found that 2% or less will be sufficient to give the desired results and frequently as little as 0.5% or even 0.1% will give definitely satisfactory results from the standpoint of retarding the loss of carotene during storage.

The heat may be applied to the alfalfa either at atmospheric, super or sub atmospheric pressures. It is satisfactory for the heat treatment to be conducted at atmospheric pressure and preferably the temperature of the alfalfa should reach about 250° F. at some stage in the course of the drying operation.

It is during the drying at the high heat and in the presence of the alfalfa, that the reaction takes place whereby the conditions conducive to stabilization are effected. Heat is absolutely necessary as otherwise the desired reaction will not occur. Where the alfalfa has for example been sun dried, the application of the dextrose-lecithin combination will be of not nearly the same value as where the dextrose-lecithin combination had been applied to the wet alfalfa and then a high heat applied.

Where it is desired to treat an already dried grass, it is necessary for that grass to be subjected to the heat treatment and it is preferable under those conditions for the grass to be wetted so that its moisture content is brought back to about 60%, and then dried to the low moisture content following the admixture of the sugar lecithin combination.

It is not satisfactory to dry the alfalfa first and then to add the dextrose-lecithin combination as the dextrose-lecithin must be added before the heat treatment or during the heat treatment so that it reacts with the alfalfa at the high heat of drying.

Among other mixtures that may be employed for addition to alfalfa before the high heat treatment are the following:

1. A mixture of equal parts of sucrose and lecithin.
2. A mixture of 25% phosphoric acid and 75% glucose.
3. A mixture of 50% calcium acid phosphate and 50% lactose.
4. A mixture of 5% lecithin and 95% blackstrap molasses.
5. A mixture of 30% lecithin and 70% crude cane sugar.

Where the stabilizing material is to be mixed with the alfalfa, it is desirable for that product to be placed into a usable powdered form so that it may readily be mixed with and dispersed throughout the alfalfa before the drying operation.

A sugar lecithin combination preferably using powdered sugar, may be prepared using from 80% to 95% of sugar and 20% to 5% of lecithin which will give a satisfactory powdered product when thoroughly admixed, and which product may satisfactorily be applied to the alfalfa and mixed with it by agitation.

The use of fillers may also be desirable, such fillers including powdered skim milk, calcium phosphate, chalk, lime, bone meal, and similar products that would act either as inert fillers or aid in the antioxidant operation or both.

It is also possible to mix the dextrose lecithin combination, for exxmple, in water or skim milk and to use such material for spraying on the alfalfa in the revolving cylinder at the time of the drying operation, or such aqueous suspension may be added direct to the alfalfa before or during the drying.

It is also possible to emulsify the dextrose lecithin combination in water or skim milk and then to spray dry, drum dry or tray dry the resultant material that is obtained. Or the dextrose lecithin combination may be mixed into a heavy liquid such as molasses and held in suspension in that liquid for subsequent mixture with the alfalfa before the application of the high heat.

The tannins normally present in the alfalfa appear also to be helpful in reacting with added sugar under conditions of high heat treatment, say above 250° F. for 10 minutes, to reduce loss of carotene.

In addition to using combinations of sugars and phosphorus containing compounds, it is also possible to use chemical compounds that contain both the sugars and the phosphorus materials as a unit. For example, the phosphoric acid ester of glucose may be utilized in place of phosphoric acid and glucose.

Very desirable results may also be obtained where along with the sugar and phosphorus containing materials there are employed a small proportion, preferably less than 25% against the weight of the combination, of the polycarboxylic aliphatic acids such as tartaric acid, citric acid, malic acid, etc. For example, a combination may be made up comprising 30% lecithin, 40% dextrose and 30% tartaric acid which will give good results when added to alfalfa before the drying operation at the elevated temperature.

It is also possible to use these acids with sugar alone although the best results are obtained when the sugar-phosphorus combinations have been employed. Combinations of, for example, equal parts of dextrose and tartaric acid or 5 parts of sucrose to 1 part citric acid may be employed but these other materials do not give as good results as the phosphorus containing compounds or the phosphatides when used with the sugars.

It is not desirable for a small quantity of the alfalfa to be heat treated with the dextrose and lecithin and then for that small quantity to be added to a larger quantity of alfalfa that has already been dried and that has already been subjected to a high temperature. The most favorable results are obtained where the dextrose lecithin combination is added to the entire batch of alfalfa before the heat treatment and the heat treatment applied to the entire batch containing the dextrose lecithin combination.

It has also been found that where aqueous combinations of sugars and phosphatides are applied to the alfalfa following, a drying operation, some beneficial results are obtained. For example, such a combination may be applied to alfalfa in a small amount such as in an amount of about 5% to retard the loss of carotene and vitamin A content with or without a prior addition and/or drying as above described. However, the addition should be before or during the drying at above 150° F. to 200° F. and preferably at 250° F.

In addition to the treatment of the cereal grasses that are used as fodder and for poultry and stock food, it is also possible to dry other high moisture containing vegetable materials such as spinach, carrots, peas, corn and similar vegetables as well as fruits using this process and whereby there will be retained not only the carotene content but also the vitamin C content which is so subject to oxidative deterioration and to loss through oxidation.

In all of these cases, before or during the drying of the vegetables or fruits during which they are subjected to a high heat, the dextrose lecithin or other similar compositions as identified above should be added to the vegetables or fruits and thoroughly dispersed therein and therewith before the heat treatment is applied. For all these products it is desirable to use combinations of sugars and lecithin or combinations of sugars and phosphoric acid or other phosphorus containing compounds.

In these cases the high water containing vegetable, such as carrots, is preferably macerated to form an aqueous mass. To that mass there is added and thoroughly admixed therewith the dextrose lecithin combination. Preferably this dextrose lecithin combination should itself be in finely divided or powdered form or at least in the form of an aqueous suspension. This can be accomplished by either using some filler with the dextrose lecithin combination, such as powdered skim milk, or by using sufficient sugar along with the lecithin in order to obtain a powdered material. Another means, as indicated above, is to first disperse the dextrose lecithin material in water and while agitating to add to and admix with the macerated carrots.

These carrots containing a small amount, less than 5%, and preferably less than 2%, of the dextrose lecithin combination are then subjected to the drying operation where a substantially high heat is involved.

Where it is desired to treat the carrot in its whole form, such carrot may be immersed in a boiling solution of the dextrose lecithin combination so as to coat it with sufficient of the dextrose lecithin mixture and then subject the carrot to its usual drying operation, such as by drum drying or other drying procedure. Another method is to dust the dextrose lecithin combination over the carrot, using a bellows or fine atomizer, in such a way that a sufficient quantity will adhere to its surface so that when the carrot is subsequently dried the benefits of the dextrose lecithin combination will be retained in the carrot.

In the case of fruits, such as peaches, strawberries, pineapple, pears, etc., where those fruits are subjected to a brining operation, a small amount of the dextrose lecithin combination can be present in the brine, held in suspension in the brine, using from 5% to 25% of the dextrose lecithin combination against the weight of the salt that is employed in the preparation of the brine and during the brining operation sufficient of the dextrose lecithin combination will be left at the surface of the fruit so that when such fruit is subsequently dried or canned, sufficient heat will have been employed to produce the desired antioxygenic action whereby there will be obtained not only a retardation of the loss of carotene and vitamin C content, but other forms of oxidative deterioration such as discoloration will also be greatly reduced.

In the case of a low moisture containing vegetable, such material can be sprayed with an aqueous suspension of the dextrose lecithin combination and then subjected to a drying operation at the elevated temperature. Flours such as cereal flours, including oat flour, wheat flour, rye flour, etc., or peas, beans, etc., may be treated by adding thereto and thoroughly admixing therewith a relatively small amount of the dextrose lecithin combination and then subjecting those materials to an elevated temperature of above 250° F. such as by steaming or by placing in drying chambers as in the case of the alfalfa above described.

Among other materials that may be treated in this manner are carrot tops, beet tops, and similar products that are subjected to drying operations and which normally are high in moisture, whereby elevated temperatures are applied during the drying of those products and whereby the moisture content is reduced from high proportions to relatively low proportions such as down to about 20% and preferably less than 10%.

Although alfalfa is the preferred material for treatment in accordance with this invention other forage grasses (Gramineae) such as stalks and leaves of maize, sorghum, rye, oats, timothy, June grass, redtop, tall oat, orchard grass, meadow fescue may also be dried in the same manner to produce green fodder and silage. These grasses contain from 45% to 80% total moisture content when freshly cut for use as hay and straw.

Among the other forage or green fodder legumes (Leguminosae) that may also be dried in this manner are leaves and stalks of red clover, alsike clover, China bean, soy bean, spring vetch, winter vetch, sainfoin, and serradella. These legumes also contain from 50% to 80% or more total moisture content.

*Example II*

A. Green maize grass containing 85% moisture was dried as in Example I.

B. A mixture was prepared comprising 25% soya lecithin and 75% glucose. This mixture was then diluted with 10 times its weight of water and while agitating, was sprayed into the revolving cylinder containing the green maize grass ready for drying, using 1% of the glucose-lecithin combination against the total solids of the maize grass. The hot air was then applied and the maize grass was dried.

C. The green maize grass was dried as in A and then 1% of the lecithin-glucose combination against the solids weight basis of the green maize grass was added and thoroughly distributed by careful and complete agitation.

Upon storage for 3 months, it was observed that although the maize grass C retained carotene longer than grass A, grass B held its carotene content for approximately 60% longer than did either grass A or grass C.

It is also possible to dry other organic materials in this manner such as paper, egg yolk, egg albumen, etc., whereby prior to that drying operation the addition of the dextrose lecithin combination will materially retard oxidative deterioration thereof. The heat treatment may naturally be applied in any manner such as by subjecting the product to be treated to a momentary and instantaneous high pressure and high temperature treatment or by applying heat directly in the form of a direct flame, or by applying heat in the form of heated air as indicated above.

It is not well understood as to exactly what takes place under conditions of the high heat, but it is assumed that a chemical reaction does occur whereby the loss of carotene and other oxidative deterioration is materially retarded.

In the preservation of alfalfa and similar vegetable material, lecithin alone may, where desired, be employed in an amount of less than 2% for admixture with such material before subjecting to the 250° F. heat treatment.

It is also possible to include or use other materials. For example, there may be employed a small proportion, less than 5%, of (a) the oil containing seeds and nuts, preferably finely divided and ground and/or in deoiled condition such as soya flour, soya press cake, sesame press cake, cottonseed flour, cottonseed press cake, cacao press cake, cacao shells, etc., all of which may be added to the alfalfa before the heat treatment and the drying operation. It is not satisfactory in the case of any of these materials for the addition to be made following the drying operation as the high heat treatment is necessary in the presence of the alfalfa in order to develop the desired results.

There may also be employed (b) the spice residues such as cinnamon residue, clove residue, etc. These residues are obtained following the extraction or removal of the essential oil ingredients from the spices such as clove, cinnamon, nutmeg, pepper, mustard, etc. Moreover there may be utilized (c) the substantially crude sugars, such as crude unrefined cane sugar, crude unrefined beet sugar, sorghum molasses, etc.

Among other materials that may be utilized are (d) powdered skim milk, or other milk solids not fat such as condensed skim. Other desirable combinations include (e) mixtures of sugar and fish meal; (f) the water and alcoholic extracts of the finely divided cereals and deoiled seeds.

Having described my invention, what I claim is:

1. In the drying of alfalfa and similar vegetable material, the process of dividing the material into small pieces, adding and thoroughly dispersing therewith a relatively small amount, less than 5%, of sugar and a phosphorus compound selected from the group consisting of the phosphatides and phosphoric acid and then drying at about 250° F. to below 20% moisture, whereby the carotene content is substantially retained.

2. In the drying of alfalfa and similar vegetable material, the process of adjusting the phosphatide and sugar content thereof to about between 0.25% to 5% and then drying at about 250° F. to below 20% moisture whereby the carotene content is substantially retained.

3. In the drying of alfalfa and similar vegetable material, the process of dividing the material into small pieces, adding and thoroughly dispersing therewith a relatively small amount of a phosphorus compound selected from the group consisting of the phosphatides and phosphoric acid and then drying at about 250° F. to a water content of less than 20%, whereby the carotene content is substantially retained.

4. In the drying of high moisture containing alfalfa and similar vegetable material, the process of adding a relatively small amount of a sugar and lecithin and then drying at about 250° F. to a water content of less than 20%, whereby the carotene content is substantially retained.

5. In the drying of high moisture containing alfalfa and similar vegetable material, the process of dividing the material into small pieces, adding and thoroughly dispersing therewith a relatively small amount of high sugar and phosphatide containing material and then drying at about 250° F. to a water content of less than 20% whereby the carotene content is substantially retained.

6. A substantially stabilized carotene-containing dried alfalfa containing a small amount of the reaction product of a combination of sugar and a phosphatide, said reaction product having been formed by heating the combination with the alfalfa at a temperature of about 250° F.

7. A substantially stabilized carotene-containing dried alfalfa containing a small amount of the reaction product of a combination of sugar and a phosphorous compound selected from the group consisting of the phosphatides and phosphoric acid, said reaction product having been formed by heating the combination with the alfalfa at a temperature of about 250° F.

8. A substantially stabilized dried carotene containing grass treated with a small amount of the reaction product of a combination of sugar and a phosphorous compound selected from the group consisting of the phosphatides and phosphoric acid, said reaction product having been formed by heating the combination with the grass at a temperature of at least 250° F.

SIDNEY MUSHER.